March 18, 1969 N. M. JOHNSON 3,434,154

ELECTROGRAPHIC RECORDER EMPLOYING AN ANALOG-TO-DIGITAL CONVERTER HAVING A DUAL COMPARATOR MEANS DEFINING THE DEAD ZONE

Filed Aug. 21, 1967 Sheet 1 of 2

INVENTOR.
NICKY M. JOHNSON

BY [signature]

ATTORNEY

INVENTOR.
NICKY M. JOHNSON
BY [signature]
ATTORNEY

United States Patent Office 3,434,154

Patented Mar. 18, 1969

3,434,154

ELECTROGRAPHIC RECORDER EMPLOYING AN ANALOG-TO-DIGITAL CONVERTER HAVING A DUAL COMPARATOR MEANS DEFINING THE DEAD ZONE

Nicky M. Johnson, San Carlos, Calif., assignor to Varian Associates, Palo Alto, Calif., a corporation of California Filed Aug. 21, 1967, Ser. No. 661,873
U.S. Cl. 346—32 3 Claims
Int. Cl. G01d 9/30

ABSTRACT OF THE DISCLOSURE

An electrographic recorder is disclosed which employs an analog-to-digital converter for energizing an array of writing electrodes in accordance with the converted analog input signal. The electrographic recorder includes an error detector wherein the analog input signal is compared with a feedback reference signal derived from the output of the analog-to-digital converter to derive an error signal for causing the output of the analog-to-digital converter to track the input analog signal. The analog-to-digital converter includes a counter-circuit which is caused to count up or down or to not count at all in accordance with the error signal. A dual comparator circuit operates on the error signal for comparing the amplitude of the error signal with a pair of predetermined reference level signals corresponding to the levels at the margins defining a dead zone which preferably has a width slightly greater than the width represented by the signal level difference between adjacent writing electrodes. The output of the dual comparator is a binary coded signal which is fed to a decoder controller which decodes the binary signal and causes the counter to count up, down, or not to count at all, depending upon the coded output of the dual comparator. The dual comparator defined dead zone prevents hunting of the recorder.

*Description of the prior art*

Heretofore, electrographic recorders have been proposed employing an analog-to-digital converter for energizing an array of writing electrodes in accordance with an analog input to the recorder. Such a recorder is described and claimed in copending U.S. application 582,767 filed Sept. 28, 1966, now Patent No. 3,394,383, and assigned to the same assignee as the present invention. In this prior reference it was proposed that the analog-to-digital converter, which included a counter, would count up and down to track the analog signal in accordance with the error signal. The error signal was derived from the error detector which compared the input analog signal with a feedback reference signal derived from the counter. However, in such a recorder, substantial hunting can be obtained between adjacent writing electrodes which come closest to representing the amplitude of the analog input signal to be recorded. In other words, the phase of the error signal to the counter will keep shifting back and forth as the recorder selects first one writing electrode and then the adjacent writing electrode for writing the output signal corresponding to the input analog signal. It is desirable to provide means to prevent hunting of the recorder.

*Summary of the present invention*

The principal object of the present invention is the provision of an improved electrographic recorder of the type employing an array of writing electrodes energized by means of an analog-to-digital converter.

One feature of the present invention is the provision, in an electrographic recorder employing an analog-to-digital converter for energizing an array of writing electrodes, of means for defining a dead zone for the converter such that when the output of the analog-to-digital converter is sufficiently close to the analog input signal, the output of the analog-to-digital converter remains fixed and does not shift between that value and an adjacent value, whereby hunting is prevented.

Another feature of the present invention is the same as the preceding feature wherein the means for defining the dead zone of the analog-to-digital converter includes a pair of comparators for comparing a pair of reference signals corresponding to the limits of the dead zone to ascertain whether the error signal derived from the error detector falls inside or outside of the dead zone.

Another feature of the present invention is the same as the preceding feature wherein the output of the dual comparator circuit is a binary coded signal which is fed to a decoder which decodes the signal and causes the counter to respond accordingly.

Other features and advantages of the present invention will become apparent upon a perusal of the following specification taken in connection with the accompanying drawings wherein:

*Description of the preferred embodiments*

Figure 1:
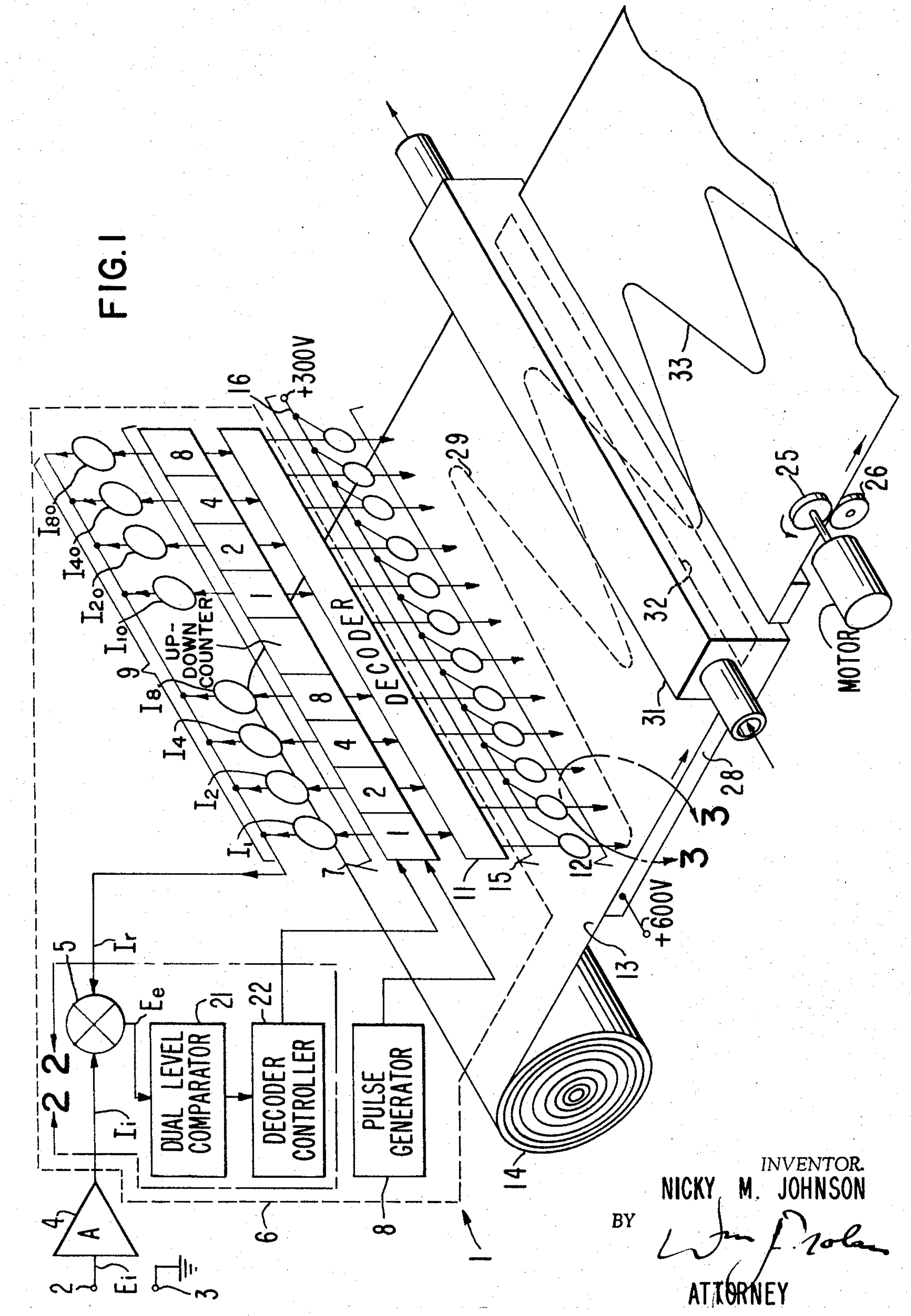
FIG. 1 is a schematic diagram, partly in block diagram form, of an electrographic recorder employing features of the present invention.

Referring now to FIG. 1, there is shown the electrographic recorder 1 of the present invention. The recorder 1 includes a pair of input terminals 2 and 3 to which an analog input signal to be recorded is applied. The input signal, typically a voltage $E_i$, is fed to a preamplifier 4 and amplified to a suitable level and converted in the output of the preamplifier 4 to a current $I_i$ having a magnitude in variable accordance with the magnitude of the voltage $E_i$ to be measured. The input current $I_i$ to be measured is fed to one input terminal of an error detector 5 forming a portion of an analog-to-digital converter 6.

The analog-to-digital converter 6 includes an up-down counter circuit 7 capable of counting at a relatively fast rate as of 1 megacycle or higher in accordance with a train of input pulses derived from a pulse generator 8. The up-down counter 7 includes two outputs. One output comprises an array of current generators 9 connected for converting the output count of the counter 7 into a feedback reference current $I_r$ of a magnitude corresponding to the count of the counter 7. A second output of the up-down counter 7 is fed to a decoder 11 which decodes the coded binary data output of the counter 7 and selectively energizes a particular one of the writing electrodes of an array of writing electrodes 12 for writing on an electrographic recording web 13 pulled from a supply roll 14 past the writing array 12. In a typical example there would be 100 writing electrodes 12. The writing potential applied to the writing electrodes 12 is typically greater than 100 volts and, therefore, gating transistors 15 are placed in series with the writing electrodes 12 between the decoder 11 and the writing electrodes 12 for controlling the relatively high writing potential applied to the transistors 15 via bus 16.

The feedback reference current $I_r$ is compared with the input current $I_i$, to be measured, in the error detector 5. The output of the error detector 5 is an error voltage $E_e$ which is fed to a dual level comparator 21, more fully described below with regard to FIGS. 2 and 3, to produce a coded binary signal having one code corresponding to an error signal indicating that the counter 7 should count up, another binary code indicating that the counter circuit 7 should count down and a third binary coded signal indicating that the error signal is within the dead zone of the count presently registered in the counter circuit 7 and, therefore, that the counter should not change its present count. The coded binary signal is fed to a decoder controller 22 which decodes the binary signal and provides the proper control signal to the counter 7.

A motor driven drive wheel 25 grips the electrographic recording medium such as electrographic recording paper 13 between the drive roller 25 and an idler roller 26 and pulls the recording paper 13 from the supply roll 14 past the array of writing electrodes 12. A second writing electrode in the form of a plate 28 is disposed under the array of writing electrodes 12 on the opposite side of the web 13 from the array 12. The writing electrode plate 28 is preferably operated at a potential as of plus 600 volts when the writing array 12 is operated at a potential of approximately plus 300 volts. The minus 300 volts, thus, applied to the writing electrodes 12 relative to the plate 28 is insufficient to cause the electrodes 12 to write, i.e., lay down a charge image on the recording web 13.

A suitable web 13 is an electrographic paper marketed by Crown Zellerbach and Plastic Coating Corporation and comprises a dielectric film supported on a slightly conductive paper backing. The paper backing is disposed adjacent the plate electrode 28 and the writing electrodes are disposed opposite the dielectric film surface.

The output of the writing decoder 11 is a low voltage control signal, as of plus 3 volts, which is sufficient to cause the selected gate transistor 15 to be biased to a conductive state causing the 300 volts potential applied to the writing electrode 12 to be grounded through the gate 15. As a result, the full minus 600 volts is applied to the writing electrode 12 relative to the plate 28 and this is sufficient to cause a charge image to be deposited upon the dielectric surface of the electrographic paper 13 by the selected writing electrode 12. Thus, an electrostatic charge image is placed upon the web 13 in accordance with the input signal $E_1$ to be measured.

The charge image 29 is then pulled underneath an inking channel 31 which has an inking slot 32 in the bottom side thereof adjacent the surface of the recording web 13 such that the charge image on the web comes in fluid communication with the interior of inking channel 31. Electrographic ink (toner) is caused to flow through the inking channel 31 at less than atmospheric pressure such that atmospheric pressure pushes the web 13 up against the inking slot 32 to form a seal and to cause the ink to come in contact with the charge image 29. The ink typically includes a colloidal suspension of pigment particles suspended in a fluid such as air or a dielectric liquid. The charged pigment particles are drawn out of the ink to the charge image to developing same at 33. The advantage of the electrographic recorder of FIG. 1 over prior recorders employing moving styli and the like is that the analog-to-digital converter has substantially no inertia and, therefore, may be employed for recording input signals that have relatively fast rise and fall times.

Figure 2:
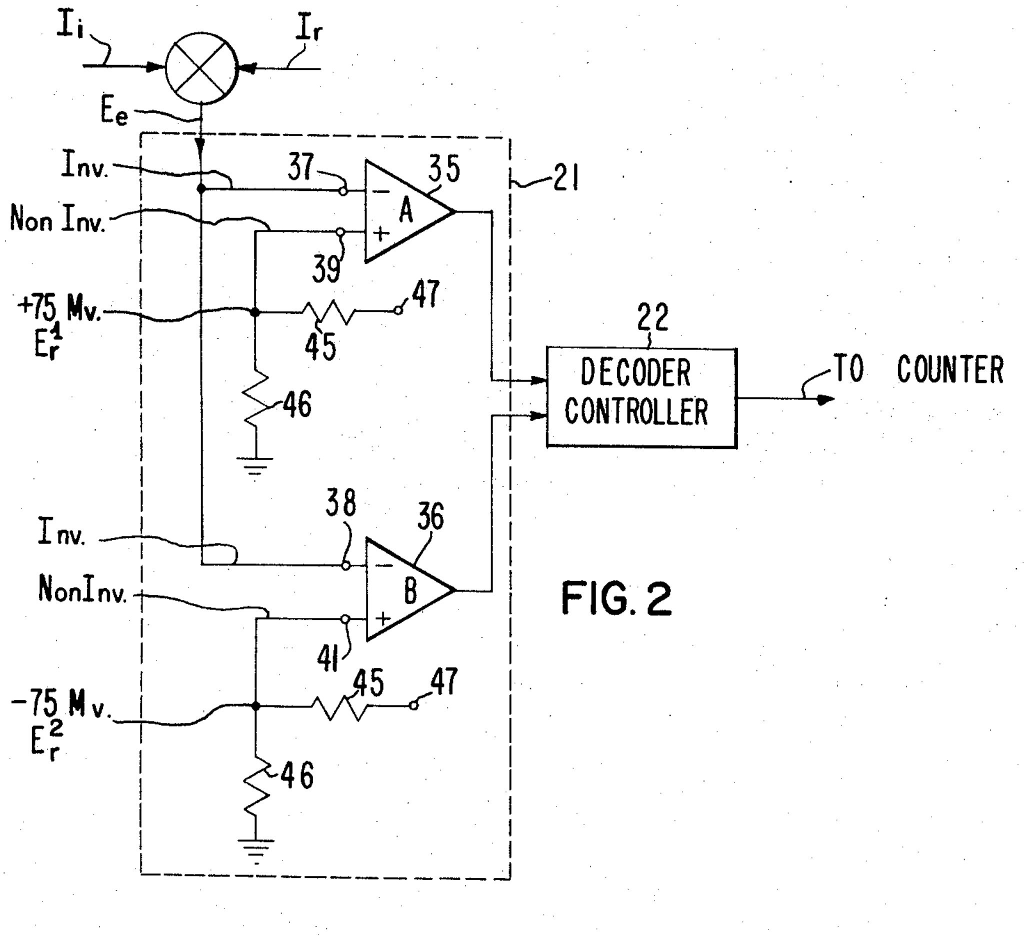
FIG. 2 is a more detailed schematic circuit diagram of a portion of a circuit of FIG. 1 delineated by line 2—2.

Referring now to FIG. 2, there is shown a dual level comparator 21 in greater detail. Dual level comparator 21 includes a first and second high speed differential comparator 35 and 36 such as a $\mu$ A710C Fairchild comparator. Each comparator includes an inverting input terminal 37 and 38, respectively, and a non-inverting reference input terminal 39 and 41, respectively, to which is applied the respective reference signal voltage for comparison with the error voltage $E_e$ derived from the output of the error detector 5.

Figure 3:
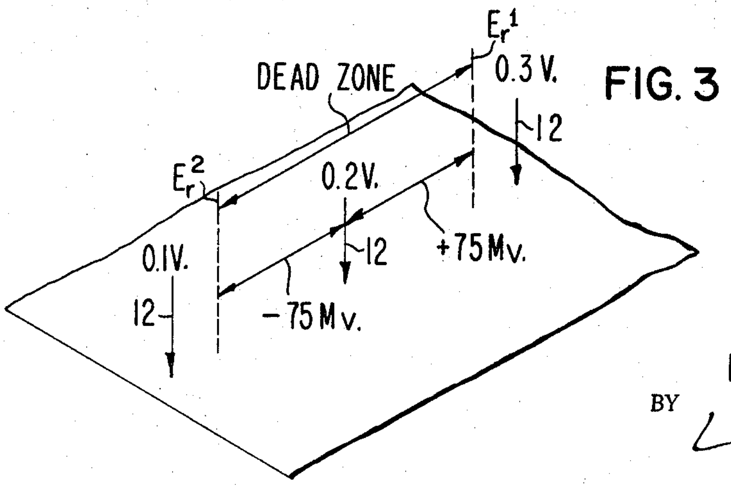
FIG. 3 is an enlarged schematic diagram of a portion of the structure of FIG. 1 delineated by line 3—3.

The first or A comparator 35 defines the upper voltage level of the dead zone by employing a reference voltage $E_r^1$ as of plus 75 millivolts which is slightly greater than one-half of the voltage difference corresponding to signal amplitude represented by adjacent writing electrodes 12. This is more clearly seen by reference to FIG. 3 wherein three successive writing electrodes 12 are shown, each electrode being identified by a voltage 0.1 volt, 0.2 volt, and 0.3 volt, respectively, corresponding to the input signal level to be recorded by each of the respective electrodes. Thus, the difference voltage between adjacent electrodes 12 is, for this example, 100 millivolts. The first reference voltage $E_r^1$ defines the upper signal level of the dead zone as plus 75 millivolts over the discrete voltage level represented by the center of the dead zone, namely, 0.2 volt. Likewise, a second reference voltage $E_r^2$ as of minus 75 millivolts is applied to the non-inverting reference input terminal 41 of the second or B comparator 36 for defining the lower voltage level of the dead zone as indicated in FIG. 3. The reference voltages $E_r$ are developed with respect to ground via a pair of voltage dividing resistors 45 and 46 and proper potential sources connected at terminals 47.

The output of each of the comparators 35 and 36 is a binary signal: that is, the output of comparator A or B can assume either of two possible states, namely 0 or a finite voltage, as of 3 volts. In the binary code, 0 volts is considered a 0 and the 3 volt output is considered a 1. Thus, the output of the two comparators A and B is a two digit code signal, A, B, when their outputs are combined in the input to the decoder controller 22. For example, if the error signal $E_e$ is minus 30 millivolts, the first comparator A compares minus 30 millivolts with the plus 75 millivolt reference and since the minus 30 millivolts does not exceed the plus 75 millivolt reference $E_r^1$ the first comparator A is not inverted and puts out 0 volts corresponding to a 0 in the binary code. The same minus 30 millivolts is applied to the second comparator B and compared again to the minus 75 millivolt reference. Since the minus 30 millivolts does not exceed the minus 75 millivolts $E_r^2$, the output of the second comparator B is not inverted and therefore it puts out a 0 binary code. Thus, for the above example of a minus 30 millivolts, the input to the decoder 22 is a binary code of 0, 0 which the decoder decodes as a DON'T COUNT command to the counter 7.

On the other hand, if one takes an error voltage $E_e$ as minus 80 millivolts, the minus 80 millivolts applied to comparator A does not exceed the plus 75 millivolt reference $E_r^1$ and, therefore, the output of comparator A is not inverted and gives a 0 in the binary code. The minus 80 volts applied to the second comparator B is compared with the minus 75 millivolts and since it exceeds the minus 75 millivolt reference $E_r^2$ it inverts the output of comparator B to produce a 1 in the binary code. Thus, the combined binary code from the output of the comparator 21 is 0, 1 which is interpreted by the decoder 22 as a command to count down.

Similarly, if the error voltage $E_e$ is plus 80 millivolts it produces an inversion of comparator A and a non-inversion of comparator B to result in a binary code of 1, 0 which is decoded in decoder 22 as a command to cause the counter 7 to count up.

Provision of the DON'T COUNT region or the dead zone prevents hunting of the recorder. The dead zone preferably has a width slightly greater than the difference in signal level voltage represented by adjacent ones of the writing electrodes 12. This voltage is 0.1 volt in the above example and is sometimes referred to as the least significant bit. However, the dead zone width need not exceed the least significant bit to substantially reduce hunting. Hunting will be reduced in proportion to the ratio of dead zone width to the width of the least significant bit.

What is claimed is:

1. In an electrographic recorder apparatus: means forming an array of electrographic writing electrodes for writing on a recording medium; means forming an analog-to-digital converter for receiving an analog input signal to be recorded and for converting same to a digital output for selectively energizing certain ones of said writing electrodes for recording the converted analog input signal; said analog-to-digital converter including, means forming a counter circuit capable of counting up and down, means forming a reference feedback signal generator responsive to the count in said counter means for providing a reference feedback signal representative of the count in said counter circuit means, means for comparing the reference feedback signal with the signal to be measured to derive a counter control signal for causing the count in said counter circuit to track changes in the input signal, the improvement wherein, said comparing means includes an error detector means for comparing the input signal to be measured with the reference feedback signal to derive an error signal, means for comparing the error signal with a pair of reference level signals having values corresponding to certain predetermined signal levels above and below the level corresponding to the discrete feedback reference signal level determined by the count in said counter means to derive the counter control signal for commanding said counter means to count up or down or to hold its present count in accordance with whether the error signal falls above, below or within the dead zone defined by the predetermined reference signal levels.

2. The apparatus of claim 1 wherein the width of the dead zone defined between the predetermined reference signal levels is slightly wider than the difference in reference signal level determined by successive counts of said counter circuit means.

3. The apparatus of claim 1 wherein said means for comparing the error signal with a pair of reference level signals includes, first and second differential comparator means, said first differential comparator means comparing the error signal with a first reference level signal to derive a first binary output, said second comparator means comparing the error signal with a second reference level signal to derive a second binary output, and means forming a decoder operative upon the first and second binary outputs for controlling the count in said counter circuit.

References Cited

UNITED STATES PATENTS

| | | | |
|---|---|---|---|
| 2,796,314 | 6/1957 | Bishop et al. | 346—33 |
| 3,394,383 | 7/1968 | Lloyd | 346—32 |

RICHARD B. WILKINSON, *Primary Examiner.*

J. W. HARTARY, *Assistant Examiner.*

U.S. Cl. X.R.

346—35, 74